United States Patent
Shinoda et al.

(10) Patent No.: US 11,255,329 B2
(45) Date of Patent: Feb. 22, 2022

(54) FLUID MACHINE

(71) Applicants: KABUSHIKI KAISHA TOYOTA JIDOSHOKKI, Aichi (JP); NOK CORPORATION, Tokyo (JP)

(72) Inventors: Fumiya Shinoda, Kariya (JP); Takayuki Hirano, Kariya (JP); Daisuke Masaki, Kariya (JP); Shintaro Kashiwa, Kariya (JP); Naoki Takani, Kariya (JP); Takahiro Kato, Kariya (JP); Yohei Miki, Aso (JP)

(73) Assignees: KABUSHIKI KAISHA TOYOTA JIDOSHOKKI, Aichi-ken (JP); NOK CORPORATION, Tokyo (JP)

( * ) Notice: Subject to any disclaimer, the term of this patent is extended or adjusted under 35 U.S.C. 154(b) by 74 days.

(21) Appl. No.: 16/725,519

(22) Filed: Dec. 23, 2019

(65) Prior Publication Data

US 2020/0208635 A1 Jul. 2, 2020

(30) Foreign Application Priority Data

Dec. 27, 2018 (JP) .............................. JP2018-246288

(51) Int. Cl.
*F04C 27/00* (2006.01)
*F16J 15/02* (2006.01)
*F04C 18/12* (2006.01)

(52) U.S. Cl.
CPC ........... *F04C 27/008* (2013.01); *F16J 15/022* (2013.01); *F04C 18/126* (2013.01)

(58) Field of Classification Search
CPC .. F16J 15/00; F16J 15/02; F16J 15/021; F16J 15/08; F16J 15/022; F16J 15/024;
(Continued)

(56) References Cited

U.S. PATENT DOCUMENTS 5,002,290 A * 3/1991 Pernin ..................... F16J 15/024
277/649
6,722,660 B2 * 4/2004 Gernand ................ F16J 15/061
277/591

(Continued)

FOREIGN PATENT DOCUMENTS

JP S55-93758 6/1980
JP S63-34384 3/1988
(Continued)

*Primary Examiner* — Nathan Cumar
(74) *Attorney, Agent, or Firm* — Greenblum & Bernstein, P.L.C.

(57) ABSTRACT

A seal member includes pushing projections that project from a seal body toward at a groove inner-side circumferential surface and are arranged at intervals in a circumferential direction of the seal body. The pushing projections push the seal body against the groove inner-side circumferential surface and a groove outer-side circumferential surface between the groove inner-side circumferential surface and the groove outer-side circumferential surface. This reduces the gap between the groove outer-side circumferential surface and the seal member in the seal accommodating groove. Thus, salt water is unlikely to collect in the gap between the groove outer-side circumferential surface of the seal accommodating groove and the seal member. This improves the corrosion resistance of the housing and the seal member.

7 Claims, 6 Drawing Sheets

(58) Field of Classification Search
CPC ....... F16J 15/025; F04C 27/00; F04C 27/008; F04C 18/00; F04C 18/126
USPC ........................................................ 277/641
See application file for complete search history.

(56) References Cited

U.S. PATENT DOCUMENTS

| | | | | |
|---|---|---|---|---|
| 6,981,704 | B2 * | 1/2006 | Okazaki | F16J 15/061 |
| | | | | 277/638 |
| 7,857,322 | B2 * | 12/2010 | Fietz | F16J 15/025 |
| | | | | 277/566 |
| 9,618,119 | B2 * | 4/2017 | Martin | F16J 15/106 |
| 2016/0290336 | A1 | 10/2016 | Murata | |

FOREIGN PATENT DOCUMENTS

| | | |
|---|---|---|
| JP | 2-266163 | 10/1990 |
| JP | 2003-97720 | 4/2003 |
| JP | 2006-283664 | 10/2006 |
| JP | 2008-195170 | 8/2008 |
| JP | 2008-298246 A | 12/2008 |
| JP | 2009-287659 | 12/2009 |
| JP | 2014-224589 A | 12/2014 |
| JP | 2016-196842 | 11/2016 |

* cited by examiner

FLUID MACHINE

BACKGROUND

1. Field

The present disclosure relates to a fluid machine.

2. Description of Related Art

For example, a fluid machine such as the Roots pump disclosed in Japanese Laid-Open Patent Publication No. 2006-283664 includes a first housing component and a second housing component that are coupled to each other. The first housing component includes a first forming surface, which forms a mating surface that contacts the second housing component. The second housing component includes a second forming surface, which forms a mating surface that contacts the first housing component. At least one of the first forming surface and the second forming surface has an annular seal accommodating groove. The seal accommodating groove accommodates an annular seal member, which seals the inside of the housing from the outside. The seal member is made of an elastic body.

For example, when a vehicle on which a fluid machine is mounted travels in the vicinity of seashore, salt water may enter the inside of the housing from the outside of the housing through the gap between the first forming surface of the first housing component and the second forming surface of the second housing component. In such a case, the seal member limits the entry of salt water into the housing from the outside. However, if the gap between the outer-side surface of the seal accommodating groove and the seal member is large, salt water tends to collect in the gap. When the salt concentration of the collected salt water increases, the salt water can corrode the housing and the seal member.

A fuel cell vehicle has a fuel cell system that supplies oxygen and hydrogen to a fuel cell to generate power. For example, the Roots pump disclosed in Japanese Laid-Open Patent Publication No. 2006-283664 is used as a pump that supplies hydrogen to a fuel cell. The Roots pump draws in hydrogen that has not reacted with oxygen in the fuel cell. The hydrogen contains the water generated during power generation in the fuel cell. The seal member prevents the hydrogen containing the generated water from leaking from the inside of the housing to the outside. However, if the gap between the inner-side surface of the seal accommodating groove and the seal member is large, the hydrogen containing the generated water tends to collect in the gap. The generated water contained in the hydrogen collected in the gap can corrode the housing and the seal member.

SUMMARY

Accordingly, it is an objective of the present disclosure to provide a fluid machine with an improved corrosion resistance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a fluid machine that includes a housing and a seal member is provided. The housing includes a first housing component and a second housing component, which are coupled to each other. The first housing component and the second housing component respectively have a first forming surface and a second forming surface, which form mating surfaces of the first housing component and the second housing component. An annular seal accommodating groove is provided in at least one of the first forming surface and the second forming surface. The seal member is made of an elastic body. The seal member is accommodated in the seal accommodating groove and seals an inside of the housing from an outside. The seal accommodating groove has a bottom surface and two side surfaces, which are connected to the bottom surface. The seal member includes a seal body that contacts the first housing component and the second housing component and is annular or ring-shaped, and a plurality of pushing projections that project from the seal body toward at least one of the side surfaces and are arranged at intervals in a circumferential direction of the seal body. The seal body is pushed against the side surfaces by the pushing projections between the side surfaces.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A fluid machine according to a first embodiment will now be described with reference to FIGS. 1 to 6. In the first embodiment, the fluid machine is a Roots pump 10. The Roots pump 10 of the first embodiment is mounted on a fuel cell vehicle. The fuel cell vehicle has a fuel cell system, to which oxygen and hydrogen are supplied to generate power. The Roots pump 10 is used as a pump that supplies hydrogen (hydrogen off-gas), which is fluid, to a fuel cell.

Figure 1:
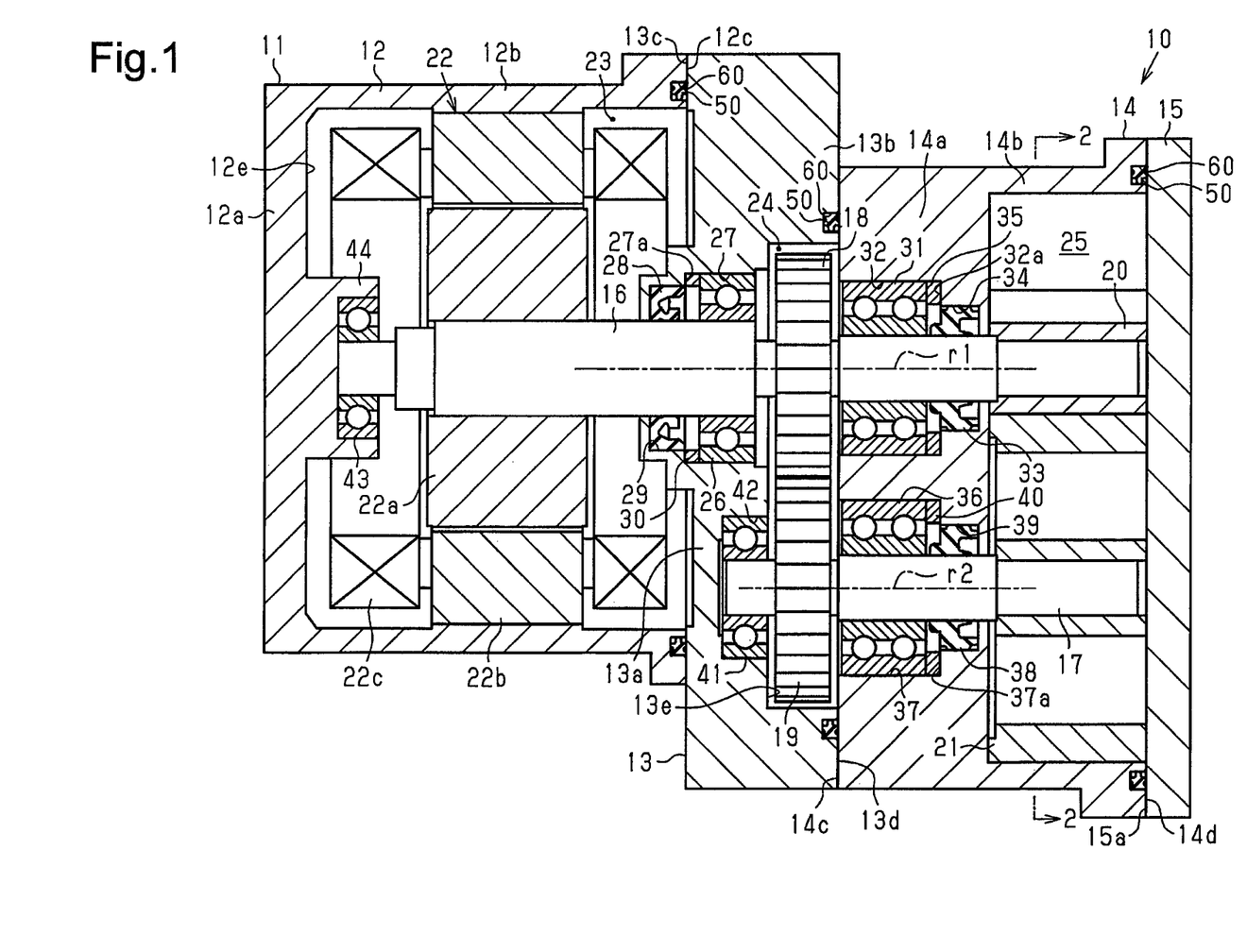
FIG. 1 is a cross-sectional plan view of a Roots pump according to a first embodiment.

As shown in FIG. 1, the Roots pump 10 includes a tubular housing 11, which includes a motor housing member 12, a gear housing member 13, a rotor housing member 14, and a cover member 15. The motor housing member 12 has a tubular shape with a closed end and includes a plate-shaped bottom wall 12a and a circumferential wall 12b, which extends from the outer periphery of the bottom wall 12a. The gear housing member 13 has a tubular shape with a closed end and includes a plate-shaped bottom wall 13a and a circumferential wall 13b, which extends from the outer periphery of the bottom wall 13a.

The gear housing member 13 is coupled to the part of the circumferential wall 12b of the motor housing member 12 near the opening with an outer surface 13c of the bottom wall 13a and an opening end face 12c of the circumferential wall 12b abutting against each other. The bottom wall 13a of the gear housing member 13 closes the opening of the circumferential wall 12b of the motor housing member 12. The axial direction of the circumferential wall 12b of the motor housing member 12 matches the axial direction of the circumferential wall 13b of the gear housing member 13.

The rotor housing member 14 has a tubular shape with a closed end and includes a plate-shaped bottom wall 14a and a circumferential wall 14b, which extends from the outer periphery of the bottom wall 14a. The rotor housing member 14 is coupled to the part of the circumferential wall 13b of the gear housing member 13 near the opening with an outer surface 14c of the bottom wall 14a and an opening end face 13d of the circumferential wall 13b abutting against each other. The bottom wall 14a of the rotor housing member 14 closes the opening of the circumferential wall 13b of the gear housing member 13. The axial direction of the circumferential wall 13b of the gear housing member 13 matches the axial direction of the circumferential wall 14b of the rotor housing member 14.

The cover member 15 is shaped like a plate. The cover member 15 is coupled to the part of the circumferential wall 14b of the rotor housing member 14 near the opening with an end face 15a of the cover member 15 and an opening end face 14d of the circumferential wall 14b abutting against each other. The cover member 15 closes the opening of the circumferential wall 14b of the rotor housing member 14.

The Roots pump 10 includes a drive shaft 16 and a driven shaft 17. The drive shaft 16 and the driven shaft 17 are rotationally supported by the housing 11 while being arranged parallel with each other. The rotation axis directions of the drive shaft 16 and the driven shaft 17 match the axial directions of the circumferential walls 12b, 13b, and 14b. The drive shaft 16 is fixed to a disk-shaped drive gear 18. The driven shaft 17 is fixed to a disk-shaped driven gear 19, which meshes with the drive gear 18. The drive shaft 16 is provided with a drive rotor 20. The driven shaft 17 is provided with a driven rotor 21, which meshes with the drive rotor 20.

The Roots pump 10 includes an electric motor 22 that rotates the drive shaft 16. The housing 11 has a motor chamber 23, which accommodates the electric motor 22. The motor chamber 23 is defined by the bottom wall 12a of the motor housing member 12, the circumferential wall 12b of the motor housing member 12, and the bottom wall 13a of the gear housing member 13. The electric motor 22 includes a cylindrical motor rotor 22a and a cylindrical stator 22b. The motor rotor 22a is secured to the drive shaft 16 so as to rotate integrally with the drive shaft 16. The stator 22b is fixed to the inner circumferential surface of the circumferential wall 12b of the motor housing member 12 and is arranged to surround the motor rotor 22a. The stator 22b includes a coil 22c, which is wound about teeth (not shown). When power is supplied to the coil 22c, the electric motor 22 is activated so that the motor rotor 22a rotates integrally with the drive shaft 16.

The housing 11 has a gear chamber 24, which accommodates the drive gear 18 and the driven gear 19. The gear chamber 24 is defined by the bottom wall 13a of the gear housing member 13, the circumferential wall 13b of the gear housing member 13, and the bottom wall 14a of the rotor housing member 14. The drive gear 18 and the driven gear 19 are accommodated in the gear chamber 24 while meshing with each other. Oil is sealed in the gear chamber 24. The oil contributes to lubrication of the drive gear 18 and the driven gear 19 and suppression of temperature increase. The drive gear 18 and the driven gear 19 rotate while being soaked in the oil. This allows the drive gear 18 and the driven gear 19 to rotate at high speed without seizing or wearing.

The housing 11 has a rotor chamber 25, which accommodates the drive rotor 20 and the driven rotor 21. The rotor chamber 25 is defined by the bottom wall 14a of the rotor housing member 14, the circumferential wall 14b of the rotor housing member 14, and the cover member 15. The drive rotor 20 and the driven rotor 21 are accommodated in the rotor chamber 25 while meshing with each other. In the first embodiment, the motor chamber 23, the gear chamber 24, and the rotor chamber 25 are arranged in this order along the rotation axis direction of the drive shaft 16.

The bottom wall 13a of the gear housing member 13 separates the gear chamber 24 and the motor chamber 23 from each other in the rotation axis direction of the drive shaft 16. The bottom wall 14a of the rotor housing member 14 separates the gear chamber 24 and the rotor chamber 25 from each other in the rotation axis direction of the drive shaft 16. The cover member 15 separates the rotor chamber 25 from the outside.

The drive shaft 16 extends through the bottom wall 13a of the gear housing member 13 and the bottom wall 14a of the rotor housing member 14. The driven shaft 17 extends through the bottom wall 14a of the rotor housing member 14. An inner bottom surface 13e of the bottom wall 13a of the gear housing member 13 provides a wall surface in the gear chamber 24 that is closer to the motor chamber 23. The outer surface 14c of the bottom wall 14a of the rotor housing member 14 provides a wall surface in the gear chamber 24 that is closer to the rotor chamber 25.

A first bearing accommodation recess 27, which is a circular hole, is provided in the inner bottom surface 13e of the gear housing member 13. The first bearing accommodation recess 27 accommodates a first bearing 26, which rotationally supports the drive shaft 16. The drive shaft 16 extends through the first bearing accommodation recess 27.

A first seal accommodation recess 29, which is a circular hole, is provided in the bottom surface 27a of the first bearing accommodation recess 27. The first seal accommodation recess 29 receives the drive shaft 16 extending therethrough and accommodates an annular first seal member 28, which seals the gear chamber 24 and the motor chamber 23 from each other. The first seal accommodation recess 29 is continuous with the first bearing accommodation recess 27. A first spacer 30 is arranged between the first bearing 26 and the bottom surface 27a of the first bearing accommodation recess 27.

A second bearing accommodation recess 32, which is a circular hole, is provided in the outer surface 14c of the rotor housing member 14. The second bearing accommodation recess 32 accommodates a second bearing 31, which rotationally supports the drive shaft 16. The drive shaft 16 extends through the second bearing accommodation recess 32. A second seal accommodation recess 34, which is a circular hole, is provided in the bottom surface 32a of the second bearing accommodation recess 32. The second seal accommodation recess 34 receives the drive shaft 16 extending therethrough and accommodates an annular second seal member 33, which seals the gear chamber 24 and the rotor chamber 25 from each other. The second seal accommodation recess 34 is continuous with the second bearing accommodation recess 32. An annular second spacer 35 is arranged between the second bearing 31 and the bottom surface 32a of the second bearing accommodation recess 32.

Also, a third bearing accommodation recess 37, which is a circular hole, is provided in the outer surface 14c of the rotor housing member 14. The third bearing accommodation recess 37 accommodates a third bearing 36, which rotationally supports the driven shaft 17. The driven shaft 17 extends through the third bearing accommodation recess 37. A third seal accommodation recess 39, which is a circular hole, is provided in the bottom surface 37a of the third bearing accommodation recess 37. The third seal accommodation recess 39 receives the driven shaft 17 extending therethrough and accommodates an annular third seal member 38, which seals the gear chamber 24 and the rotor chamber 25 from each other. The third seal accommodation recess 39 is continuous with the third bearing accommodation recess 37. An annular third spacer 40 is arranged between the third bearing 36 and the bottom surface 37a of the third bearing accommodation recess 37.

A fourth bearing accommodation recess 42, which is a circular hole, is provided in the inner bottom surface 13e of the gear housing member 13. The fourth bearing accommodation recess 42 accommodates a fourth bearing 41, which rotationally supports a first end of the driven shaft 17. The first end of the driven shaft 17 is arranged in the fourth bearing accommodation recess 42 and is rotationally supported by the fourth bearing 41. The driven shaft 17 has a second end that extends through the third bearing accommodation recess 37 and the third seal accommodation recess 39 and protrudes into the rotor chamber 25. The driven rotor 21 is attached to the second end of the driven shaft 17. The second end of the driven shaft 17 is a free end. The driven shaft 17 is thus supported in a cantilever-like manner by the housing 11.

A cylindrical bearing portion 44 is provided in an inner bottom surface 12e of the bottom wall 12a of the motor housing member 12. The bearing portion 44 accommodates a fifth bearing 43, which rotationally supports a first end of the drive shaft 16. The first end of the drive shaft 16 is arranged inside the bearing portion 44 and is rotationally supported by the fifth bearing 43. The drive shaft 16 has a second end that extends through the first seal accommodation recess 29, the first bearing accommodation recess 27, the gear chamber 24, the second bearing accommodation recess 32, and the second seal accommodation recess 34, and protrudes into the rotor chamber 25. The drive rotor 20 is attached to the second end of the drive shaft 16. The second end of the drive shaft 16 is a free end. The drive shaft 16 is thus supported in a cantilever-like manner by the housing 11.

Figure 2:
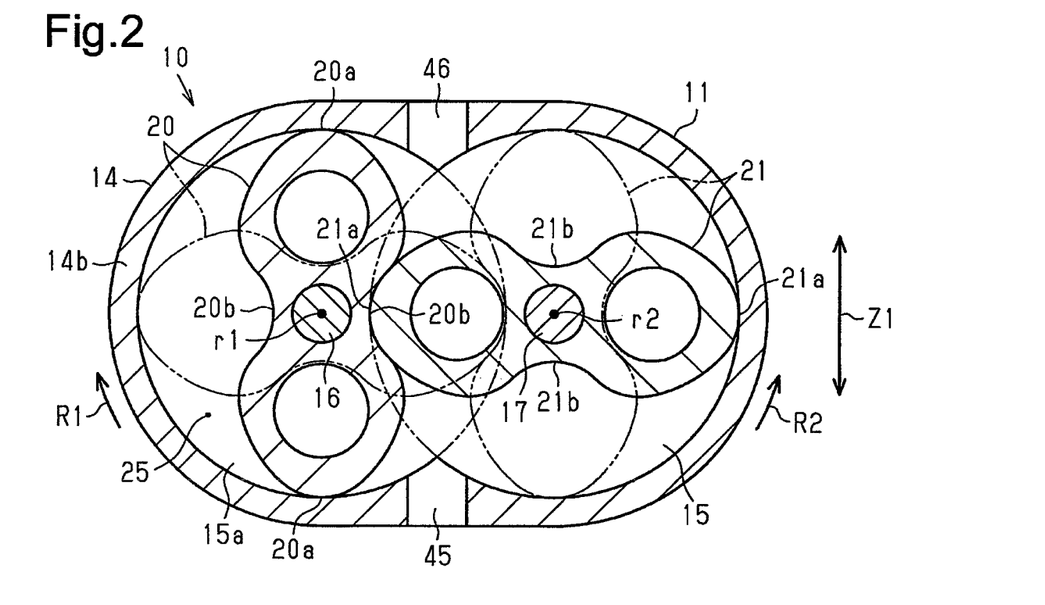
FIG. 2 is a cross-sectional view taken along line 2-2 of FIG. 1.

As shown in FIG. 2, the drive rotor 20 and the driven rotor 21 each have a two-lobe shape (gourd-like shape) in a cross section perpendicular to the rotation axis directions of the drive shaft 16 and the driven shaft 17. The drive rotor 20 includes two lobes 20a and two recesses 20b arranged between the lobes 20a. The driven rotor 21 includes two lobes 21a and two recesses 21b arranged between the lobes 21a.

The drive rotor 20 and the driven rotor 21 are capable of rotating in the rotor chamber 25, while repeating meshing between the lobes 20a of the drive rotor 20 and the recesses 21b of the driven rotor 21, and meshing between the recesses 20b of the drive rotor 20 and the lobes 21a of the driven rotor 21. The drive rotor 20 rotates in a direction of arrow R1 in FIG. 2. The driven rotor 21 rotates in a direction of arrow R2 in FIG. 2.

The circumferential wall 14b of the rotor housing member 14 has a suction port 45 and a discharge port 46. The suction port 45 and the discharge port 46 face the rotor chamber 25 and are opposed to each other. The suction port 45 and the discharge port 46 connect the rotor chamber 25 to the outside.

A straight line direction Z1, which connects the suction port 45 and the discharge port 46 to each other, intersects with and is orthogonal to the rotation axes r1, r2 of the drive shaft 16 and the driven shaft 17. The Roots pump 10 is mounted on the fuel cell vehicle with the suction port 45 facing downward. The straight line direction Z1 matches the gravity direction. The discharge port 46 is arranged to face upward in the straight line direction Z1, and the suction port 45 is arranged to face downward in the straight line direction Z1.

When the drive shaft 16 is rotated by the electric motor 22, the driven shaft 17 is rotated in a direction opposite to the rotating direction of the drive shaft 16 through the meshing engagement between the drive gear 18 and the driven gear 19. This causes the drive rotor 20 and the driven rotor 21 to rotate in the opposite directions while meshing with each other. In this manner, the Roots pump 10 draws in hydrogen to the rotor chamber 25 from the suction port 45 and discharges hydrogen in the rotor chamber 25 from discharge port 46 through rotation of the drive rotor 20 and the driven rotor 21.

As shown in FIG. 1, annular seal members 50 are each provided between the opening end face 12c of the motor housing member 12 and the outer surface 13c of the bottom wall 13a of the gear housing member 13, between the opening end face 13d of the gear housing member 13 and the outer surface 14c of the bottom wall 14a of the rotor housing member 14, and between the opening end face 14d of the rotor housing member 14 and the end face 15a of the cover member 15. The respective seal members 50 seal between the opening end face 12c of the motor housing member 12 and the outer surface 13c of the bottom wall 13a of the gear housing member 13, between the opening end face 13d of the gear housing member 13 and the outer surface 14c of the bottom wall 14a of the rotor housing member 14, and between the opening end face 14d of the rotor housing member 14 and the end face 15a of the cover member 15. Each respective seal member 50 seals the inside of the housing 11 from the outside. Each seal member 50 is made of an elastic body. The seal members 50 made of rubber.

Figure 3:
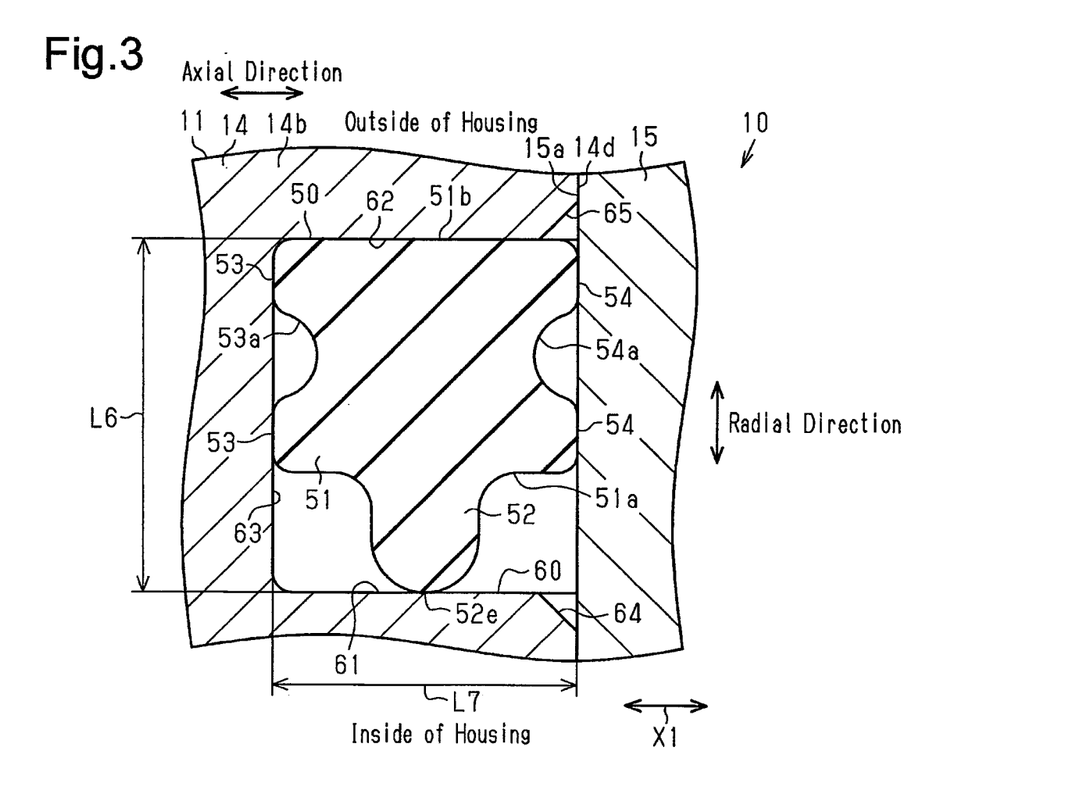
FIG. 3 is an enlarged cross-sectional side view showing a seal member and its surroundings.

With reference to FIG. 3, the configuration of the seal member 50 provided between the opening end face 14d of the rotor housing member 14 and the end face 15a of the cover member 15 will be described. The configuration of the seal member 50 provided between the opening end face 12c of the motor housing member 12 and the outer surface 13c of the bottom wall 13a of the gear housing member 13 will not be described since it is the same as the configuration of the seal member 50 provided between the opening end face 14d of the rotor housing member 14 and the end face 15a of the cover member 15. Likewise, the configuration of the seal member 50 provided between the opening end face 13d of the gear housing member 13 and the outer surface 14c of the bottom wall 14a of the rotor housing member 14 will not be described since it is the same as the configuration of the seal member 50 provided between the opening end face 14d of the rotor housing member 14 and the end face 15a of the cover member 15.

As shown in FIG. 3, the seal member 50 is accommodated in an annular seal accommodating groove 60. The seal accommodating groove 60 is provided in the opening end face 14d of the rotor housing member 14, which has a first housing component. The opening of the seal accommodating groove 60 is closed by the end face 15a of the cover member 15, which is a second housing component. The opening end face 14d of the rotor housing member 14 is a first forming surface, which forms a mating surface that contacts the cover member 15. The end face 15a of the cover member 15 is a second forming surface, which forms a mating surface that contacts the rotor housing member 14. In the first embodiment, the seal accommodating groove 60 is formed in the first forming surface. The opening of the seal accommodating groove 60 is closed by the second forming surface. The housing 11 includes the first housing component and the second housing component, which are coupled to each other.

The seal accommodating groove 60 has a groove inner-side circumferential surface 61, which is located on the inner side in the housing 11, and a groove outer-side circumferential surface 62, which is located on the outer side in the housing 11. The seal accommodating groove 60 has an annular groove bottom surface 63. The groove bottom surface 63 connects the edge of the groove inner-side circumferential surface 61 on the side opposite to the open side of the seal accommodating groove 60 and the edge of the groove outer-side circumferential surface 62 on the side opposite to the open side of the seal accommodating groove 60. The seal accommodating groove 60 thus includes the groove bottom surface 63, which is a bottom surface, and two side surfaces connected to the groove bottom surface 63, which are the groove inner-side circumferential surface 61 and the groove outer-side circumferential surface 62. The groove inner-side circumferential surface 61 and the groove outer-side circumferential surface 62 extend parallel with the axial direction of the circumferential wall 14b of the rotor housing member 14. The groove bottom surface 63 extends in a direction orthogonal to the axial direction of the circumferential wall 14b of the rotor housing member 14. The groove bottom surface 63 extends parallel with the opening end face 14d of the rotor housing member 14.

The seal accommodating groove 60 has an annular groove inner-side chamfered portion 64 and an annular groove outer-side chamfered portion 65. The groove inner-side chamfered portion 64 is provided between the opening end face 14d of the rotor housing member 14 and the edge of the groove inner-side circumferential surface 61 on the open side of the seal accommodating groove 60. The groove outer-side chamfered portion 65 is provided between the opening end face 14d of the rotor housing member 14 and the edge of the groove outer-side circumferential surface 62 on the open side of the seal accommodating groove 60. The groove inner-side chamfered portion 64 and the groove outer-side chamfered portion 65 are straight chamfers that intersect with the opening end face 14d of the rotor housing member 14.

Figure 4:
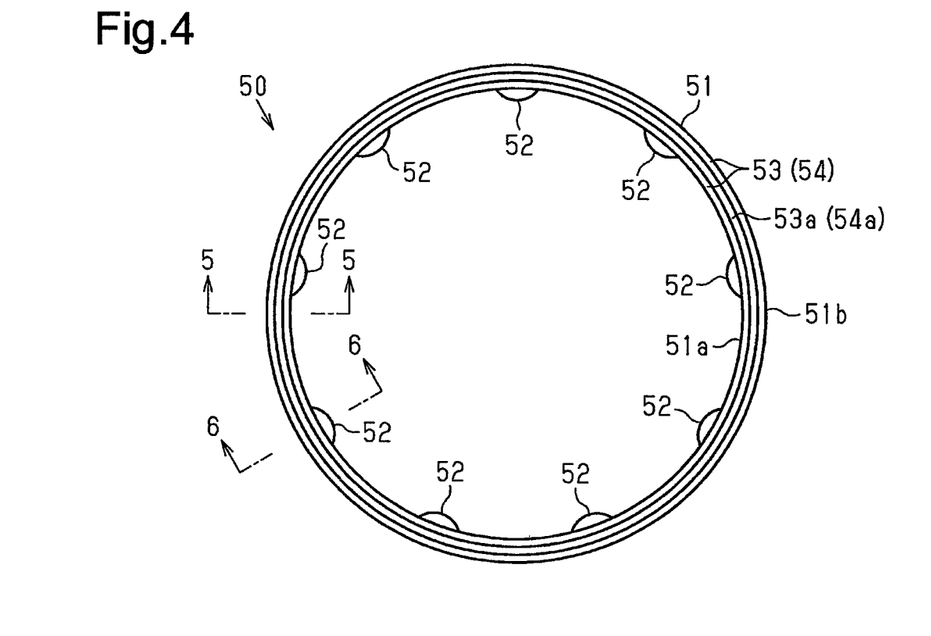
FIG. 4 is a front view of the seal member.

As shown in FIG. 4, the seal member 50 includes an annular seal body 51 and pushing projections 52. The pushing projections 52 project from an inner circumferential surface 51a of the seal body 51 and are arranged at intervals in the circumferential direction of the seal body 51. In the following description, the direction extending through the center of the seal body 51 will be referred to as an axial direction of the seal body 51. The direction extends outward from the axis of the seal body 51 will be referred to as a radial direction of the seal body 51. In the first embodiment, nine pushing projections 52 project from the inner circumferential surface 51a of the seal body 51. The nine pushing projections 52 are arranged at equal intervals in the circumferential direction of the seal body 51. Each pushing projection 52 is shaped as a thin plate bulging from the inner circumferential surface 51a of the seal body 51. The thickness direction of each pushing projection 52 matches the axial direction of the seal body 51. Each pushing projection 52 has a pair of first surfaces in the thickness direction. The first surfaces are parallel with each other and flat. Each pushing projection 52 has a second surface in the direction of bulging from the inner circumferential surface 51a of the seal body 51. The second surface is curved and continuous with the inner circumferential surface 51a of the seal body 51.

Figure 5:
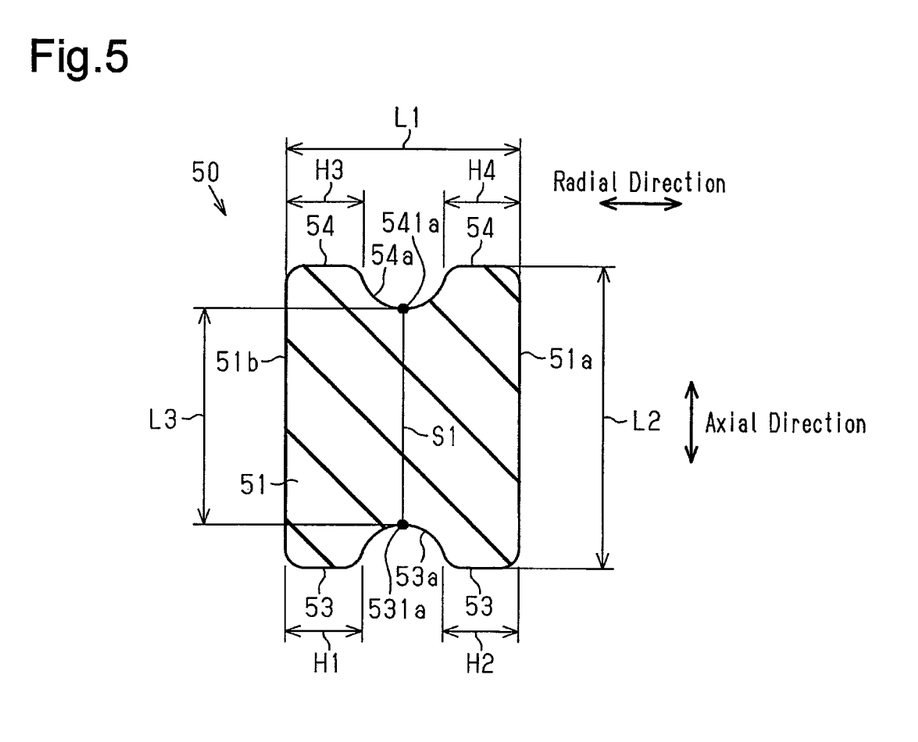
FIG. 5 is a cross-sectional view taken along line 5-5 of FIG. 4.

As shown in FIG. 5, the seal body 51 has annular first lip portions 53. In the first embodiment, the seal body 51 has two first lip portions 53. The two first lip portions 53 are spaced apart from each other in the radial direction of the seal body 51 and extend over the entire circumference of the seal body 51. The seal body 51 also has a first recess 53a provided between the first lip portions 53, which are adjacent to each other.

The two first lip portions 53 and the first recess 53a are provided on an end face located on a first side in the axial direction of the seal body 51. One of the first lip portions 53 that is located on the outer side in the radial direction of the seal body 51 is continuous with an outer circumferential surface 51b of the seal body 51. One of the first lip portions 53 that is located on the inner side in the radial direction of the seal body 51 is continuous with the inner circumferential surface 51a of the seal body 51. The two first lip portions 53 are adjacent to each other in the radial direction of the seal body 51. The outer surfaces of the two first lip portions 53 overlap with each other in the radial direction of the seal body 51. The outer surfaces of the two first lip portions 53 are connected to each other by the inner surface of the first recess 53a. The inner surface of the first recess 53a is curved to be arcuate.

The first lip portion 53 located on the outer side in the radial direction of the seal body 51 has a lip width H1 in the radial direction of the seal body 51. The lip width H1 is constant in the circumferential direction of the seal body 51. Also, the first lip portion 53 located on the inner side in the radial direction of the seal body 51 has a lip width H2 in the radial direction of the seal body 51. The lip width H2 is constant in the circumferential direction of the seal body 51. The lip widths H1 and H2 of the two first lip portions 53 are the same.

The seal body 51 has annular second lip portions 54. In the first embodiment, the seal body 51 has two second lip portions 54. The two second lip portions 54 are spaced apart from each other in the radial direction of the seal body 51 and extend over the entire circumference of the seal body 51. The seal body 51 also has a second recess 54a provided between the second lip portions 54, which are adjacent to each other.

The two second lip portions 54 and the second recess 54a are provided on an end face located on a second side in the axial direction of the seal body 51. One of the second lip portions 54 that is located on the outer side in the radial direction of the seal body 51 is continuous with the outer circumferential surface 51b of the seal body 51. One of the second lip portions 54 that is located on the inner side in the radial direction of the seal body 51 is continuous with the inner circumferential surface 51a of the seal body 51. The two second lip portions 54 are adjacent to each other in the radial direction of the seal body 51. The outer surfaces of the two second lip portions 54 overlap with each other in the radial direction of the seal body 51. The outer surfaces of the two second lip portions 54 are connected to each other by the inner surface of the second recess 54a. The inner surface of the second recess 54a is curved to be arcuate.

The second lip portion 54 located on the outer side in the radial direction of the seal body 51 has a lip width H3 in the radial direction of the seal body 51. The lip width H3 is constant in the circumferential direction of the seal body 51. Also, the second lip portion 54 located on the inner side in the radial direction of the seal body 51 has a lip width H4 in the radial direction of the seal body 51. The lip width H4 is constant in the circumferential direction of the seal body 51. The lip widths H3 and H4 of the two second lip portions 54 are the same. The lip widths H1, H2 of the two first lip portions 53 are the same as the lip widths H3, H4 of the two second lip portions 54.

A distance L1 in the radial direction of the seal body 51 between the inner circumferential surface 51a and the outer circumferential surface 51b of the seal body 51 is smaller than a distance L2 in the axial direction of the seal body 51 between the outer surface of the first lip portion 53 and the outer surface of the second lip portion 54. A deepest section 531a of the first recess 53a and a deepest section 541a of the second recess 54a are arranged to overlap with each other in the axial direction of the seal body 51. Thus, a straight line S1 connecting the deepest section 531a of the first recess 53a and the deepest section 541a of the second recess 54a extends in the axial direction of the seal body 51. In the first embodiment, a length L3 of the straight line S1 connecting the deepest section 531a of the first recess 53a and the deepest section 541a of the second recess 54a is constant in the circumferential direction of the seal body 51. Thus, the depths of the first recess 53a and the second recess 54a are constant in the circumferential direction of the seal body 51. The depth of the first recess 53a is the same as the depth of the second recess 54a.

Figure 6:
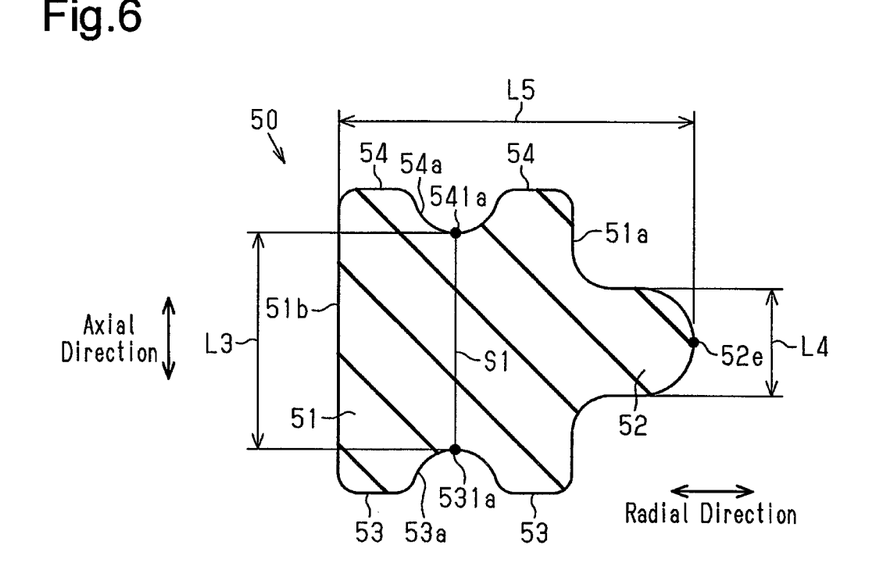
FIG. 6 is a cross-sectional view taken along line 6-6 of FIG. 4.

FIG. 6 illustrates a state of the seal member 50 before being accommodated in the seal accommodating groove 60. As shown in FIG. 6, each pushing projection 52 is arranged at the center in the axial direction on the inner circumferential surface 51a of the seal body 51. Before the seal member 50 is accommodated in the seal accommodating groove 60, a length L4 of the pushing projection 52 in the axial direction is smaller than the length L3 of the straight line S1, which connects the deepest section 531a of the first recess 53a to the deepest section 541a of the second recess 54a. Before the seal member 50 is accommodated in the seal accommodating groove 60, a distance L5 in the radial direction of the seal body 51 between the outer circumferential surface 51b of the seal body 51 and a distal end 52e of the pushing projection 52 is smaller than a distance L6 in the radial direction of the seal accommodating groove 60 between the groove inner-side circumferential surface 61 and the groove outer-side circumferential surface 62, as shown in FIG. 3. Further, a depth L7 of the seal accommodating groove 60 is greater than the length L3 of the straight line S1, which connects the deepest section 531a of the first recess 53a and the deepest section 541a of the second recess 54a. Therefore, the depth L7 of the seal accommodating groove 60 is greater than the length L4 of the pushing projection 52 in the axial direction.

The seal member 50 is designed to have the property shown below before being accommodated in the seal accommodating groove 60, that is, before being elastically deformed in the seal accommodating groove 60. That is, the seal member 50 is designed to have over 100% of filling factor in relation to the seal accommodating groove 60 when viewed in the cross section passing through the distal end 52e of the pushing projection 52 in the axial direction of the seal body 51, that is, when viewed in the cross section of FIG. 6.

As shown in FIG. 3, the two first lip portions 53 are in contact with the groove bottom surface 63 of the seal accommodating groove 60. Thus, the two first lip portions 53 constitute a first seal portion that contacts the rotor housing member 14 in the mating direction of the opening end face 14d of the rotor housing member 14 and the end face 15a of the cover member 15 (indicated by arrow X1 in FIG. 3). Also, the two second lip portions 54 are in contact with the end face 15a of the cover member 15. Thus, the two second lip portions 54 constitute a second seal portion that contacts the cover member 15 in the mating direction of the opening end face 14d of the rotor housing member 14 and the end face 15a of the cover member 15. The mating direction of the opening end face 14d of the rotor housing member 14 and the end face 15a of the cover member 15 matches the axial direction of the circumferential wall 14b of the rotor housing member 14. The seal body 51 contacts the rotor housing member 14 and the cover member 15.

The pushing projections 52 project from the inner circumferential surface 51a of the seal body 51 toward the groove inner-side circumferential surface 61 of the seal accommodating groove 60. The pushing projections 52 contact and push the groove inner-side circumferential surface 61. At this time, the seal body 51 receives, from the groove inner-side circumferential surface 61, a reaction force to the pushing force acting on the groove inner-side circumferential surface 61 by the pushing projections 52. Accordingly, the seal body 51 is pushed against and contacts the groove outer-side circumferential surface 62. Thus, the pushing projections 52 push the seal body 51 against the groove inner-side circumferential surface 61 and the groove outer-side circumferential surface 62 between the groove inner-side circumferential surface 61 and the groove outer-side circumferential surface 62.

An operation of the first embodiment will now be described.

The seal member 50 is designed to have, before being elastically deformed in the seal accommodating groove 60, over 100% of filling factor in relation to the seal accommodating groove 60 when viewed in the cross section passing through the distal end 52e of the pushing projection 52 in the axial direction of the seal body 51. Thus, when the cover member 15 is attached to the rotor housing member 14, the seal member 50 is crushed in the mating direction of the opening end face 14d of the rotor housing member 14 and the end face 15a of the cover member 15 while causing the two first lip portions 53 to contact the groove bottom surface 63 of the seal accommodating groove 60 and causing the two second lip portions 54 to contact the end face 15a of the cover member 15. Accordingly, the sealing member 50 is crushed and elastically deformed, so that the pushing projections 52 contact and push the groove inner-side circumferential surface 61.

When the pushing projections 52 push the groove inner-side circumferential surface 61, the pushing projections 52 are crushed by receiving the reaction force from the groove inner-side circumferential surface 61. As the pushing projections 52 are crushed, the seal body 51 is elastically deformed to spread to both sides in the circumferential direction of the seal body 51 from the pushing projections 52. At this time, the two first lip portions 53 are in contact with the groove bottom surface 63 of the seal accommodating groove 60, and the two second lip portions 54 contact the end face 15a of the cover member 15. Thus, the whole seal body 51 is allowed to be elastically deformed into the gap between the outer circumferential surface 51b of the seal body 51 and the groove outer-side circumferential surface 62. As a result, the seal body 51 is elastically deformed to cause the outer circumferential surface 51b to contact and push the groove outer-side circumferential surface 62.

For example, when the fuel cell vehicle travels in the vicinity of seashore, salt water may enter the inside of the housing 11 from the outside of the housing 11 through the gap between the opening end face 14d of the rotor housing member 14 and the end face 15a of the cover member 15. In this case, the seal member 50 limits the entry of salt water into the housing 11 from the outside through the gap between the opening end face 14d of the rotor housing member 14 and the end face 15a of the cover member 15.

For example, salt water that flows through the gap between the opening end face 14d of the rotor housing member 14 and the end face 15a of the cover member 15 flows, in some cases, through the gap between the outer circumferential surface 51b of the seal body 51 and the groove outer-side circumferential surface 62 and the gap between the groove bottom surface 63 and the first lip portion 53 located on the outer side in the radial direction of the seal body 51. In this case, since the salt water is dispersed in the first recess 53a, the straightness of the flow of the salt water will be lost. Accordingly, the salt water is unlikely to pass the seal member 50 and is unlikely to enter the housing 11.

For example, the salt water flowing through the gap between the opening end face 14d of the rotor housing member 14 and the end face 15a of the cover member 15 flows, in some cases, flows through the gap between the end face 15a of the cover member 15 and the second lip portion 54 located on the outer side in the radial direction of the seal body 51. In this case, since the salt water is dispersed in the second recess 54a, the straightness of the flow of the salt water will be lost. Accordingly, the salt water is unlikely to pass the seal member 50 and is unlikely to enter the housing 11.

Also, the outer circumferential surface 51b of the seal body 51 receives, from the groove inner-side circumferential surface 61, a reaction force to the pushing force acting on the groove inner-side circumferential surface 61 by the pushing projections 52. Accordingly, the seal body 51 is pushed against and contacts the groove outer-side circumferential surface 62. This reduces the gap between the groove outer-side circumferential surface 62 and the seal member 50. Thus, salt water is unlikely to collect in the gap between the groove outer-side circumferential surface 62 of the seal accommodating groove 60 and the seal member 50.

The first embodiment has the following advantages.

(1-1) The seal member 50 includes the pushing projections 52. The pushing projections 52 project from the seal body 51 toward the groove inner-side circumferential surface 61 and are arranged at intervals in the circumferential direction of the seal body 51. Also, the pushing projections 52 push the seal body 51 against the groove inner-side circumferential surface 61 and the groove outer-side circumferential surface 62 between the groove inner-side circumferential surface 61 and the groove outer-side circumferential surface 62. This reduces the gap between the groove outer-side circumferential surface 62 and the seal member 50 in the seal accommodating groove 60. Thus, salt water is unlikely to collect in the gap between the groove outer-side circumferential surface 62 and the seal member 50. This improves the corrosion resistance of the housing 11 and the seal member 50.

(1-2) The first lip portions 53 constitute a first seal portion that contacts the rotor housing member 14 in the mating direction of the opening end face 14d of the rotor housing member 14 and the end face 15a of the cover member 15. Also, the second lip portions 54 constitute a second seal portion that contacts the cover member 15 in the mating direction of the opening end face 14d of the rotor housing member 14 and the end face 15a of the cover member 15. This configuration disperses salt water flowing through the gap between the opening end face 14d of the rotor housing member 14 and the end face 15a of the cover member 15 inside the first recess 53a between the adjacent first lip portions 53 and in the second recess 54a between the adjacent second lip portions 54. Accordingly, the straightness of the flow of the salt water will be lost, so that the salt water is unlikely to pass the seal member 50. This improves the sealing performance of the seal member 50.

(1-3) The distance L1 in the radial direction of the seal body 51 between the inner circumferential surface 51a and the outer circumferential surface 51b of the seal body 51 is smaller than the distance L2 in the axial direction of the seal body 51 between the outer surface of the first lip portion 53 and the outer surface of the second lip portion 54. Even in this case, when the cover member 15 is attached to the rotor housing member 14, the seal member 50 is prevented from collapsing and being twisted since the pushing projections 52 contact the groove inner-side circumferential surface 61.

(1-4) The length L4 of the pushing projection 52 in the axial direction of the seal body 51 is smaller than the length L3 of the straight line S1, which connects the deepest section 531a of the first recess 53a and the deepest section 541a of the second recess Ma. Also, the depth L7 of the seal accommodating groove 60 is greater than the length L4 of the pushing projection 52 in the axial direction of the seal body 51. This prevents the pushing projections 52 from contacting the groove bottom surface 63 of the seal accommodating groove 60 or the end face 15a of the cover member 15. This allows the seal body 51 to receives, from the groove inner-side circumferential surface 61, a reaction force to the pushing force acting on the groove inner-side circumferential surface 61 by the pushing projections 52. Accordingly, the seal body 51 is easily elastically deformed to cause the outer circumferential surface 51b to contact and push the groove outer-side circumferential surface 62. As a result, the gap between the groove outer-side circumferential surface 62 and the seal member 50 in the seal accommodating groove 60 is reduced reliably.

(1-5) Before the seal member 50 is accommodated in the seal accommodating groove 60, the distance L5 in the radial direction of the seal body 51 between the outer circumferential surface 51b of the seal body 51 and a distal end 52e of the pushing projection 52 is smaller than the distance L6 in the radial direction of the seal accommodating groove 60 between the groove inner-side circumferential surface 61 and the groove outer-side circumferential surface 62. This allows the seal member 50 to be readily accommodated in the seal accommodating groove 60. Thus, the seal member 50 is readily installed in the seal accommodating groove 60.

(1-6) The depth L7 of the seal accommodating groove 60 is greater than the length L3 of the straight line S1, which connects the deepest section 531a of the first recess 53a and the deepest section 541a of the second recess 54a. Accordingly, even if the seal member 50 is crushed between the opening end face 14d of the rotor housing member 14 and the end face 15a of the cover member 15, the first recess 53a and the second recess 54a are unlikely to disappear. Also, even if the seal body 51 is elastically deformed by the reaction force to the pushing force acting on the groove inner-side circumferential surface 61 by the pushing projections 52, the first recess 53a and the second recess 54a are unlikely to disappear.

(1-7) The pushing projections 52 are arranged at intervals in the circumferential direction of the seal body 51. This configuration has the following advantages over the case in which, for example, a pushing projection projects from the entire circumference of the inner circumferential surface 51a of the seal body 51. That is, when the pushing projections 52 are crushed, the seal body 51 is easily elastically deformed to spread to both sides in the circumferential direction of the seal body 51 from the pushing projections 52. This prevents the seal body 51 from being elastically deformed to push away the cover member 15. Thus, the sealing property between the opening end face 14d of the rotor housing member 14 and the end face 15a of the cover member 15 is unlikely to be lowered.

Second Embodiment

A fluid machine according to a second embodiment will now be described with reference to FIGS. 7 to 9. In the second embodiment, the fluid machine is a Roots pump. In the embodiments described below, the same reference numerals are given to those components that are the same as the corresponding components of the first embodiment, which has already been described, and explanations are omitted or simplified.

Figure 7:
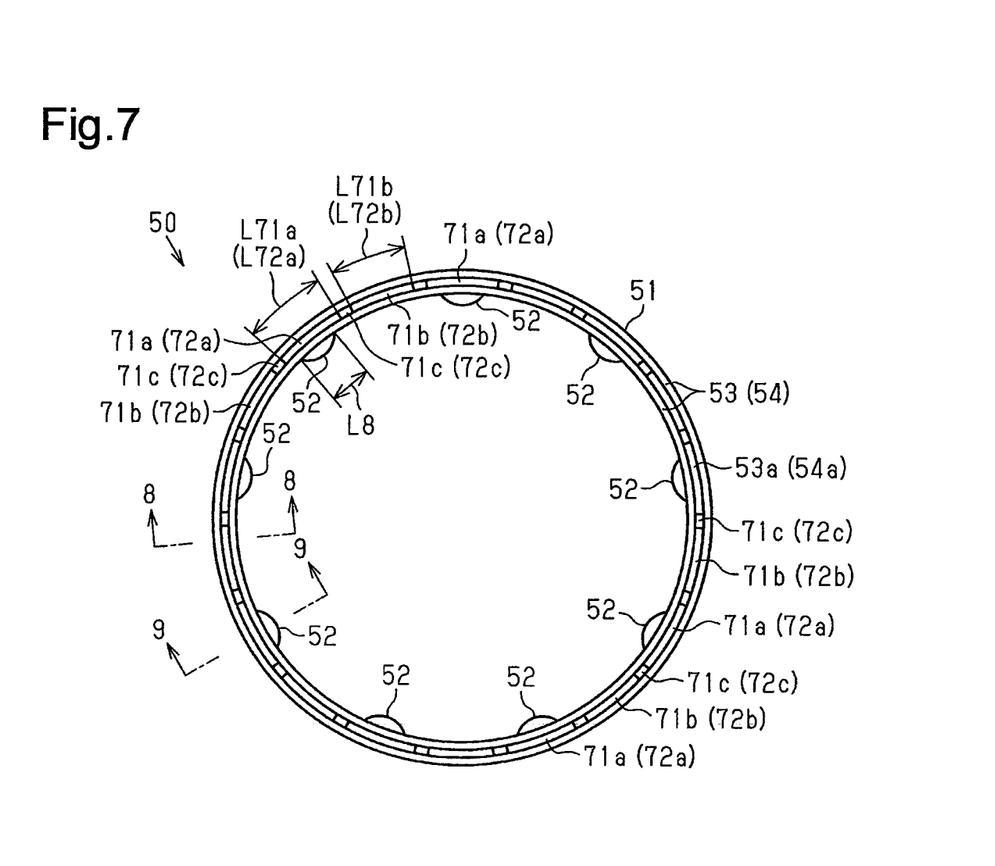
FIG. 7 is a front view of a seal member according to a second embodiment.
Figure 8:
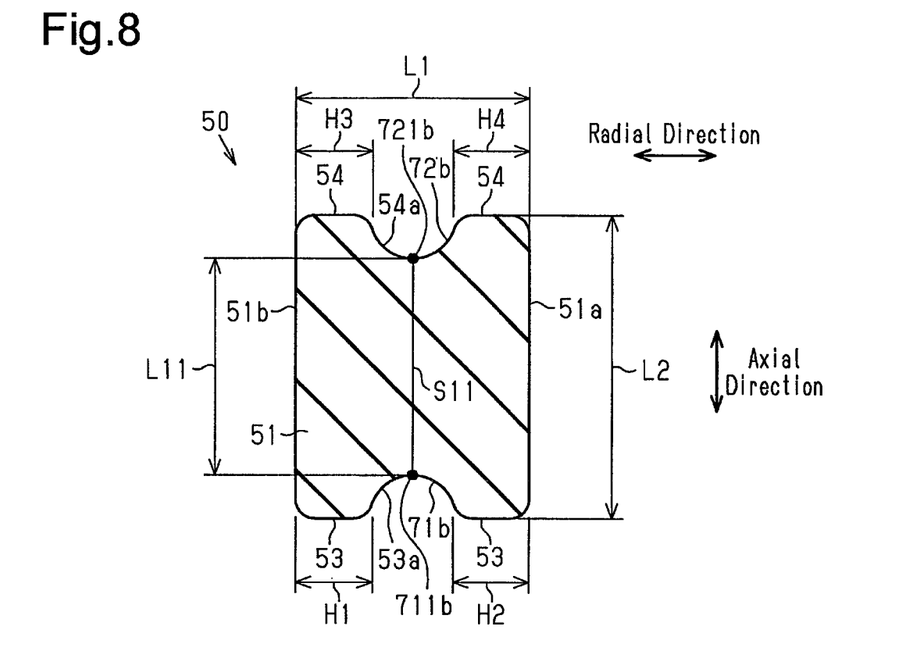
FIG. 8 is a cross-sectional view taken along line 8-8 of FIG. 7.
Figure 9:
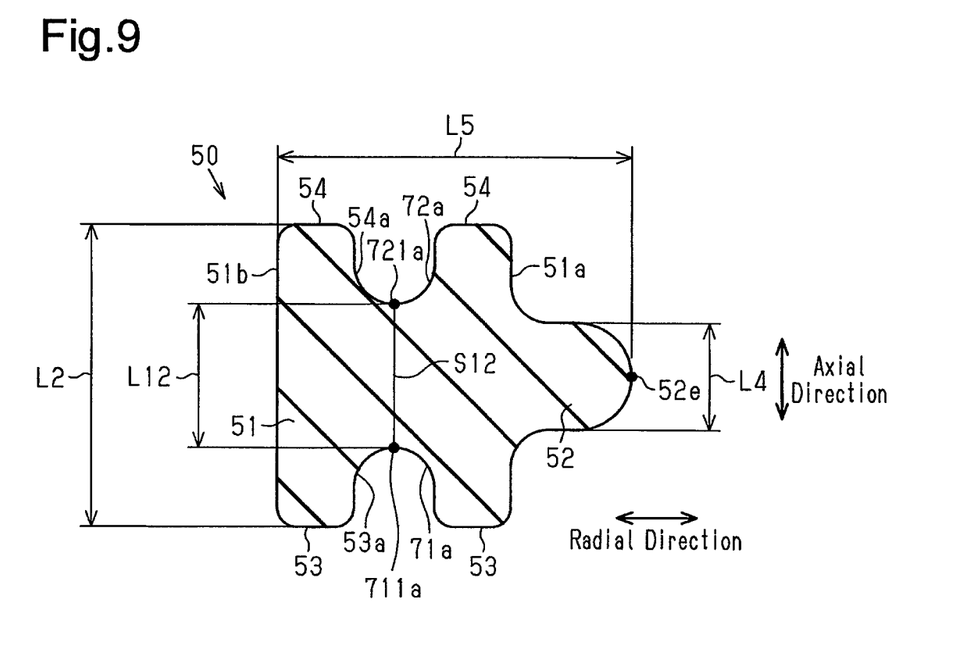
FIG. 9 is a cross-sectional view taken along line 9-9 of FIG. 7.

As shown in FIGS. 7, 8, and 9, in the seal body 51, the annular first recess 53a, which is formed between the adjacent first lip portions 53, and the annular second recess 54a, which is formed between the adjacent second lip portions 54, are deeper at positions corresponding to the pushing projections 52 than other positions.

As shown in FIG. 7, the first recess 53a has first deep groove portions 71a and first shallow groove portions 71b. Each first deep groove portion 71a is arranged at the position corresponding to one of the pushing projections 52 in the seal body 51. Thus, the first recess 53a has nine first deep groove portions 71a. The nine first deep groove portions 71a are arranged at equal intervals in the circumferential direction of the seal body 51. In the first recess 53a, each first shallow groove portion 71b is located between an adjacent pair of the first deep groove portions 71a. Thus, the first recess 53a has nine first shallow groove portions 71b. The nine first shallow groove portions 71b are arranged at equal intervals in the circumferential direction of the seal body 51.

The first deep groove portions 71a have the same length L71a in the circumferential direction of the seal body 51. The first shallow groove portions 71b have the same length L71b in the circumferential direction of the seal body 51. The first deep groove portion 71a and the first shallow groove portion 71b that are adjacent to each other in the circumferential direction of the seal body 51 are connected to each other by a first step portion 71c.

The second recess 54a has second deep groove portions 72a and second shallow groove portions 72b. Each second deep groove portion 72a is arranged at the position corresponding to one of the pushing projections 52 in the seal body 51. Thus, the second recess 54a has nine second deep groove portions 72a. The nine second deep groove portions 72a are arranged at equal intervals in the circumferential direction of the seal body 51. In the second recess 54a, each second shallow groove portion 72b is located between an adjacent pair of the second deep groove portions 72a in the circumferential direction of the seal body 51. Thus, the second recess 54a has nine second shallow groove portions 72b. The nine second shallow groove portions 72b are arranged at equal intervals in the circumferential direction of the seal body 51.

The second deep groove portions 72a have the same length L72a in the circumferential direction of the seal body 51. The second shallow groove portions 72b have the same length L72b in the circumferential direction of the seal body 51. The second deep groove portion 72a and the second shallow groove portion 72b that are adjacent to each other in the circumferential direction of the seal body 51 are connected to each other by a second step portion 72c.

The length L71a of the first deep groove portion 71a in the circumferential direction of the seal body 51 is the same as the length L72a of the second deep groove portion 72a in the circumferential direction of the seal body 51. Also, the length L71b of the first shallow groove portion 71b in the circumferential direction of the seal body 51 is the same as the length L72b of the second shallow groove portion 72b in the circumferential direction of the seal body 51.

As shown in FIG. 8, the inner surfaces of the first shallow groove portion 71b and the second shallow groove portion 72b are curved to have arcuate shapes. The depth of the first shallow groove portion 71b is the same as the depth of the second shallow groove portion 72b. As shown in FIG. 9, the inner surfaces of the first deep groove portion 71a and the second deep groove portion 72a are curved to have arcuate shapes. The depth of the first deep groove portion 71a is the same as the depth of the second deep groove portion 72a. As shown in FIGS. 8 and 9, a distance L11 of a straight line S11 that connects a deepest section 711b of the first shallow groove portion 71b and a deepest section 721b of the second shallow groove portion 72b is greater than a distance L12 of a straight line S12 that connects a deepest section 711a of the first deep groove portion 71a and a deepest section 721a of the second deep groove portion 72a.

The distance L12 of the straight line S12 that connects the deepest section 711a of the first deep groove portion 71a and the deepest section 721a of the second deep groove portion 72a is smaller than half the distance L2 in the axial direction of the seal body 51 between the outer surface of the first lip portion 53 and the outer surface of the second lip portion 54.

The distance L12 of the straight line S12 that connects the deepest section 711a of the first deep groove portion 71a and the deepest section 721a of the second deep groove portion 72a is greater than the length L4 of the pushing projection 52 in the axial direction of the seal body 51.

As shown in FIG. 7, the length L71a of the first deep groove portion 71a in the circumferential direction of the seal body 51 and the length L72a of the second deep groove portion 72a in the circumferential direction of the seal body 51 are greater than the length L8 of the pushing projection 52 in the circumferential direction of the seal body 51. Particularly, the length L71a of the first deep groove portion 71a and the length L72a of the second deep groove portion 72a are greater than twice the length L8 of the pushing projection 52. When the seal member 50 is viewed in the axial direction, each pushing projection 52 overlaps with the first deep groove portion 71a and the second deep groove portion 72a in the radial direction of the seal body 51. Thus, the first recess 53a and the second recess 54a are deeper at positions corresponding to the pushing projections 52 than other positions.

An operation of the second embodiment will now be described.

The parts of the seal body 51 that corresponds to the pushing projections 52 receive, from the groove inner-side circumferential surface 61, a reaction force to the pushing force acting on the groove inner-side circumferential surface 61 by the pushing projections 52. The amount of deformation of each of the parts that correspond to the pushing projections 52 is greater than that of the other parts by the crushed amount of the pushing projection 52. In this regard, in the second embodiment, the first recess 53a and the second recess 54a are deeper at positions corresponding to the pushing projections 52 than other positions. Thus, even if the pushing projections 52 are crushed so that the seal body 51 is deformed, the first recess 53a and the second recess 54a are unlikely to disappear at the sections corresponding to the pushing projections 52.

In addition to the advantages (1-1) to (1-7) of the first embodiment, the second embodiment has the following advantages.

(2-1) In the seal body 51, the first recess 53a and the second recess 54a are deeper at positions corresponding to the pushing projections 52 than other positions. Thus, even if the pushing projections 52 are crushed so that the seal body 51 is deformed, the first recess 53a and the second recess 54a are unlikely to disappear at the sections corresponding to the pushing projections 52. This ensures the sealing performance of the seal member 50.

(2-2) The distance L12 of the straight line S12 that connects the deepest section 711a of the first deep groove portion 71a and the deepest section 721a of the second deep groove portion 72a is greater than the length L4 of the pushing projection 52 in the axial direction of the seal body 51. Thus, when the pushing projections 52 are crushed so that the seal body 51 is deformed, the first lip portion 53 and the second lip portion 54 are unlikely to collapse toward the first recess 53a and the second recess 54a, respectively.

(2-3) When the pushing projections 52 are crushed, the seal body 51 is deformed. At this time, the deformation influences parts of the first recess 53a and the second recess 54a that correspond to the pushing projections 52. The area of such influence is greater than the length L8 of the pushing projection 52. As such, the length L71a of the first deep groove portion 71a and the length L72a of the second deep groove portion 72a are made greater than the length L8 of the pushing projection 52. Particularly, the length L71a of the first deep groove portion 71a and the length L72a of the second deep groove portion 72a are made greater than twice the length L8 of the pushing projection 52. With this configuration, even if the pushing projections 52 are crushed so that the seal body 51 is deformed, the parts of the first recess 53a and the second recess 54a that correspond to the pushing projections 52 are further unlikely to disappear.

(2-4) Since the parts of the first recess 53a and the second recess 54a that correspond to the pushing projections 52 are made deeper than other positions, a certain volume of the seal member 50 is reduced. The reduced volume can be allocated to the first lip portion 53 and the second lip portion 54. This allows the lip widths H1, H2 of the two first lip portions 53 and the lip widths H3, H4 of the two second lip portions 54 to be increased. Accordingly, the sealing length between the two first lip portions 53 and the rotor housing member 14 and the sealing length between the two second lip portions 54 and the cover member 15 are easily ensured.

Third Embodiment

A fluid machine according to a third embodiment will now be described with reference to FIG. 10. In the third embodiment, the fluid machine is a Roots pump.

Figure 10:
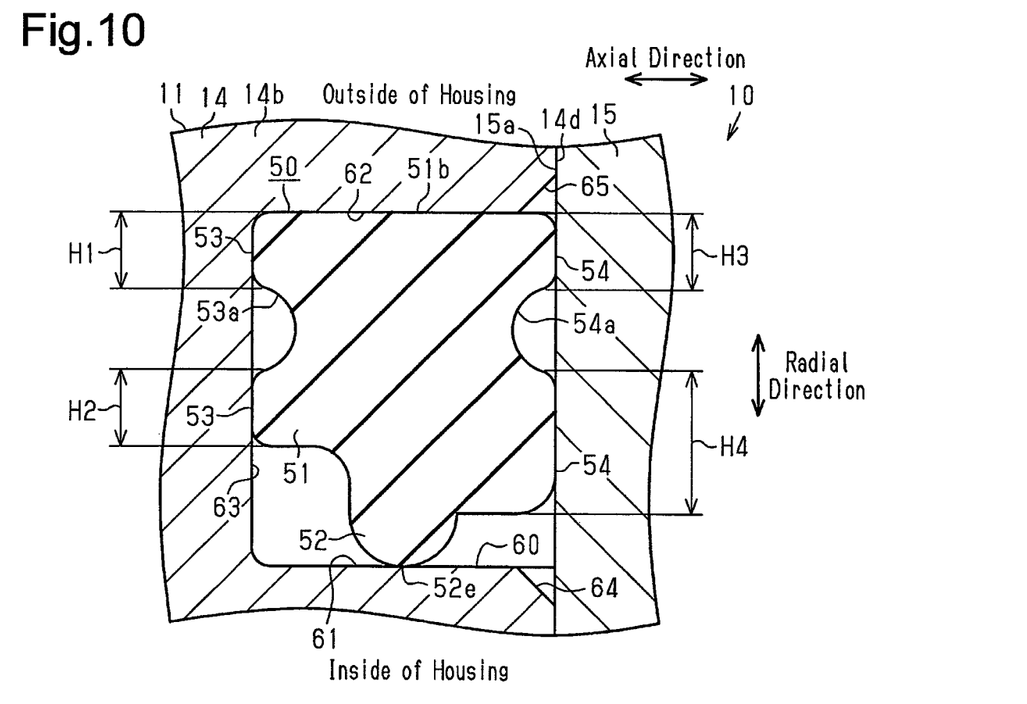
FIG. 10 is an enlarged cross-sectional side view showing a seal member according to a third embodiment and its surroundings.

As shown in FIG. 10, a lip width H4 of one of the two second lip portions 54 that is located on the inner side in the radial direction of the seal body 51 is greater than a lip width H3 of the second lip portion 54 that is located on the outer side in the radial direction of the seal body 51. Also, the lip width H4 of the second lip portion 54 located on the inner side in the radial direction of the seal body 51 is greater than the lip widths H1, H2 of the two first lip portions 53. The lip width H3 of the second lip portion 54 located on the outer side in the radial direction of the seal body 51 is the same as the lip widths H1, H2 of the two first lip portions 53. Thus, the sum of the lip widths H3, H4 of the two second lip portions 54 is greater than the sum of the lip widths H1, H2 of the two first lip portions 53.

In addition to the advantages (1-1) to (1-7) of the first embodiment, the third embodiment has the following advantage.

(3-1) The sealing length between the rotor housing member 14 and the seal member 50 is the sum obtained by adding the section at which the outer circumferential surface 51b of the seal body 51 contacts the groove outer-side circumferential surface 62 to the sections at which the two first lip portions 53 respectively contact the groove bottom surface 63 of the seal accommodating groove 60. In contrast, the sealing length between the cover member 15 and the seal member 50 is the sum of the sections at which the two second lip portions 54 respectively contact the end face 15a of the cover member 15. Since the sum of the lip widths H3, H4 of the two second lip portions 54 is greater than the sum of the lip widths H1, H2 of the two first lip portions 53, the difference between the sealing length between the cover member 15 and the seal member 50 and the sealing length between the rotor housing member 14 and the seal member 50 is reduced. This improves the sealing performance of the seal member 50.

Fourth Embodiment

A fluid machine according to a fourth embodiment will now be described with reference to FIGS. 11 and 12. In the fourth embodiment, the fluid machine is a Roots pump.

Figure 11:
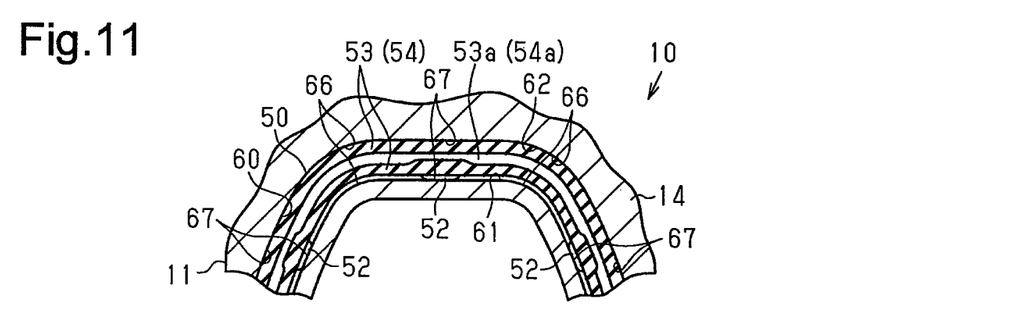
FIG. 11 is a diagram illustrating the relationship between a seal accommodating groove according to a fourth embodiment and a seal member.

As shown in FIG. 11, the groove inner-side circumferential surface 61 and the groove outer-side circumferential surface 62 each have bent portions 66 and flat portions 67. The bent portion 66 is a part that is bent locally. The flat portion 67 is a part connecting two bent portions 66 that are adjacent to each other in the circumferential direction of the seal accommodating groove 60. The groove outer-side circumferential surface 62 extends along the groove inner-side circumferential surface 61. Pushing projections 52 are each arranged at a position that is spaced apart from the bent portions 66 in the circumferential direction of the seal accommodating groove 60. Therefore, the positions of the pushing projections 52 match with the positions of the flat portions 67 in the circumferential direction of the seal accommodating groove 60.

When the pushing projections 52 push the flat portions 67 of the groove inner-side circumferential surface 61, the pushing projections 52 are crushed by receiving, from the flat portions 67, the reaction force to the pushing force applied to the flat portions 67. As the pushing projections 52 are crushed, the seal body 51 is elastically deformed to spread to both sides in the circumferential direction of the seal body 51 from the pushing projections 52. At this time, the two first lip portions 53 are in contact with the groove bottom surface 63 of the seal accommodating groove 60, and the two second lip portions 54 contact the end face 15a of the cover member 15. Thus, the whole seal body 51 is allowed to be elastically deformed into the gap between the outer circumferential surface 51b of the seal body 51 and the groove outer-side circumferential surface 62. As a result, the seal body 51 is elastically deformed to cause the outer circumferential surface 51b to contact and push the groove outer-side circumferential surface 62.

An operation of the fourth embodiment will now be described.

Figure 12:
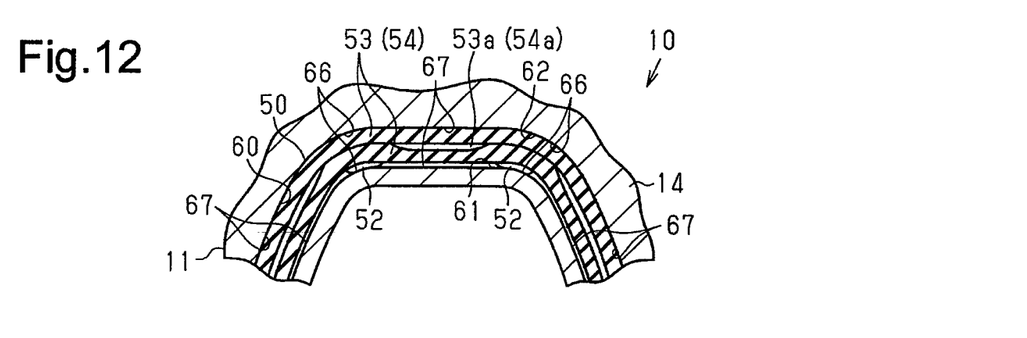
FIG. 12 is a diagram illustrating the relationship between a seal of a comparative example and a seal member.

For example, it is assumed that the positions of the pushing projections 52 match with the bent portions 66 in the circumferential direction of the seal accommodating groove 60 as shown in FIG. 12. In this case, when the pushing projections 52 push the bent portions 66 of the groove inner-side circumferential surface 61, the pushing projections 52 are crushed by receiving, from the bent portions 66, the reaction force to the pushing force applied to the bent portions 66. At this time, the seal body 51 is unlikely to be elastically deformed to spread to both sides in the circumferential direction of the seal body 51 from the pushing projections 52. Thus, in the first lip portion 53 located on the radially inner side of the seal body 51 and the second lip portion 54 located on the radially inner side of the seal body 51, the parts that correspond to the pushing projections 52 are likely to collapse toward the first recess 53a and the second recess 54a, respectively. As a result, when the pushing projections 52 are crushed so that the seal body 51 is deformed, the first recess 53a and the second recess 54a are likely to disappear at the sections corresponding to the pushing projections 52.

As such, in the fourth embodiment, the pushing projections 52 are arranged at positions that are spaced apart from the bent portions 66 in the circumferential direction of the seal accommodating groove 60 as shown in FIG. 11, that is, the positions matching the flat portions 67. With this configuration, when the pushing projections 52 are crushed, the seal body 51 is easily elastically deformed to spread to both sides in the circumferential direction of the seal body 51 from the pushing projections 52. Thus, in the first lip portion 53 located on the radially inner side of the seal body 51 and the second lip portion 54 located on the radially inner side of the seal body 51, the parts that correspond to the pushing projections 52 are unlikely to collapse toward the first recess 53a and the second recess 54a, respectively. Thus, even if the pushing projections 52 are crushed so that the seal body 51 is deformed, the sections of the first recess 53a and the second recess 54a that correspond to the pushing projections 52 are unlikely to disappear.

In addition to the advantages (1-1) to (1-7) of the first embodiment, the fourth embodiment has the following advantage.

(4-1) The pushing projections 52 are each arranged at a position that is spaced apart from the bent portions 66 in the circumferential direction of the seal accommodating groove 60. With this configuration, when the pushing projections 52 are crushed, the seal body 51 is readily elastically deformed to spread to both sides in the circumferential direction of the seal body 51 from the pushing projections 52, as compared to a case in which the positions of the pushing projections 52 match with the bent portions 66 in the circumferential direction of the seal accommodating groove 60. Thus, in the first lip portion 53 located on the radially inner side of the seal body 51 and the second lip portion 54 located on the radially inner side of the seal body 51, the parts that correspond to the pushing projections 52 are unlikely to collapse toward the first recess 53a and the second recess 54a, respectively. Thus, even if the pushing projections 52 are crushed so that the seal body 51 is deformed, the first recess 53a and the second recess 54a are unlikely to disappear at the sections corresponding to the pushing projections 52.

The above-described embodiments may be modified as follows. The above-described embodiments and the following modifications can be combined as long as the combined modifications remain technically consistent with each other.

In each of the above-described embodiments, the seal accommodating groove 60 may be provided in the end face 15a of the cover member 15 instead of the opening end face 14d of the rotor housing member 14, so that the opening of the seal accommodating groove 60 is closed by the opening end face 14d of the rotor housing member 14.

In each of the above-described embodiments, a seal accommodating groove 60 may be provided in the end face 15a of the cover member 15 in addition to that in the opening end face 14d of the rotor housing member 14, so that the seal accommodating grooves 60 overlap with each other in the mating direction of the opening end face 14d of the rotor housing member 14 and the end face 15a of the cover member 15. In short, at least one of the first forming surface of the first housing component and the second forming surface of the second housing component needs to have a seal accommodating groove 60. In this case, the two second lip portions 54 are in contact with the groove bottom surface 63 of the seal accommodating groove 60 provided in the end face 15a of the cover member 15. Also, the pushing projections 52 push the area including the groove inner-side circumferential surfaces 61 of the two seal accommodating grooves 60. The outer circumferential surface 51b of the seal body 51 is pushed against and contacts the groove outer-side circumferential surfaces 62 of the two seal accommodating grooves 60. This reduces the difference between the sealing length between the cover member 15 and the seal member 50 and the sealing length between the rotor housing member 14 and the seal member 50. Accordingly, the sealing performance of the seal member 50 is improved.

In each of the above-described embodiments, the pushing projections 52 may project from the outer circumferential surface 51b of the seal body 51. Also, the seal member 50 may be accommodated in the seal accommodating groove 60 such that the pushing projections 52 project from the seal body 51 toward the groove outer-side circumferential surface 62 and push the groove outer-side circumferential surface 62. In this case, the inner circumferential surface 51a of the seal body 51 receives a reaction force to the pushing force acting on the groove outer-side circumferential surface 62 by the pushing projections 52, so that the inner circumferential surface 51a pushes and contacts the groove inner-side circumferential surface 61. For example, the hydrogen drawn into the rotor chamber 25 contains the water generated during generation of power in the fuel cell. The seal member 50 prevents leakage of hydrogen containing the generated water to the outside of the housing 11 from the rotor chamber 25 through the gap between the opening end face 14d of the rotor housing member 14 and the end face 15a of the cover member 15. Since the inner circumferential surface 51a of the seal body 51 is pushed against and contacts the groove inner-side circumferential surface 61, the gap between the groove inner-side circumferential surface 61 and the seal member 50 is reduced. Thus, hydrogen containing generated water is unlikely to collect in the gap between the groove outer-side circumferential surface 62 of the seal accommodating groove 60 and the seal member 50. This improves the corrosion resistance of the housing 11 and the seal member 50.

In each of the above-described embodiments, the seal member 50 does not necessarily need to include the two first lip portions 53 and the first recess 53a. Also, the seal member 50 may be configured to cause the entire end face located on the first side in the axial direction to function as the first seal portion, which contacts the rotor housing member 14 in the mating direction of the opening end face 14d of the rotor housing member 14 and the end face 15a of the cover member 15. This ensures a long sealing length between the rotor housing member 14 and the seal member 50.

In each of the above-described embodiments, the seal member 50 does not necessarily need to include the two second lip portions 54 and the second recess 54a. Also, the seal member 50 may be configured to cause the entire end face located on the second side in the axial direction to function as the second seal portion, which contacts the cover member 15 in the mating direction of the opening end face 14d of the rotor housing 14 and the end face 15a of the cover member 15. This ensures a long sealing length between the cover member 15 and the seal member 50.

In the each of the above-described embodiments, the number of the first lip portions 53 may be greater than two.

In the each of the above-described embodiments, the number of the second lip portions 54 may be greater than two. Particularly, when making the sum of the lip widths H3, H4 of the two second lip portions 54 greater than the sum of the lip widths H1, H2 of the two first lip portions 53 as in the third embodiment, the number of the second lip portions 54 may be made greater than the number of the first lip portions 53 instead of changing the lip widths H3, H4.

In the above-described embodiments, the distance L1 in the radial direction of the seal body 51 between the inner circumferential surface 51a and the outer circumferential surface 51b of the seal body 51 may be greater than the distance L2 in the axial direction of the seal body 51 between the outer surface of the first lip portion 53 and the outer surface of the second lip portion 54.

In the above-described embodiments, the length L4 of the pushing projection 52 in the axial direction of the seal body 51 may be the same as the length L3 of the straight line S1, which connects the deepest section 531a of the first recess 53a and the deepest section 541a of the second recess 54a.

In the above-described embodiments, the length L4 of the pushing projection 52 in the axial direction of the seal body 51 may be greater than the length L3 of the straight line S1, which connects the deepest section 531a of the first recess 53a and the deepest section 541a of the second recess 54a, as long as the length L4 is smaller than the distance L2 in the axial direction of the seal body 51 between the outer surface of the first lip portion 53 and the outer surface of the second lip portion 54.

In the second embodiment, the length L71a of the first deep groove portion 71a and the length L72a of the second deep groove portion 72a may be greater than the length L8 of the pushing projection 52 and smaller than twice the length L8 of the pushing projection 52.

In the second embodiment, the length L71a of the first deep groove portion 71a and the length L72a of the second deep groove portion 72a may be the same as the length L8 of the pushing projection 52.

In the third embodiment, the lip width H3 in the radial direction of the seal body 51 of the second lip portion 54 located on the outer side in the radial direction of the seal body 51 may be greater than the lip width H4 in the radial direction of the seal body 51 of the second lip portion 54 located on the inner side in the radial direction of the seal body 51.

In each of the above-described embodiments, the number of the pushing projections 52 is not particularly limited as long as it is plural. For example, the number may be less than or greater than nine.

In the above-described embodiments, the pushing projections 52 may include two types of pushing projections arranged alternately in the circumferential direction of the seal body 51, one type projecting toward the groove inner-side circumferential surface 61 and the other type projecting toward the groove outer-side circumferential surface 62. In short, the seal member 50 simply needs to include pushing projections that project from the seal body 51 toward at least one of the groove inner-side circumferential surface 61 and the groove outer-side circumferential surface 62.

In each of the above-described embodiments, for example, the rotor housing member 14 and the cover member 15 may be coupled to each other with the cover member 15 fitted inside the circumferential wall 14b of the rotor housing member 14. In this case, the inner circumferential surface of the circumferential wall 14b of the rotor housing member 14 and the outer circumferential surface of the cover member 15 form mating surfaces of the rotor housing member 14 and the cover member 15. The mating direction of the inner circumferential surface of the circumferential wall 14b of the rotor housing member 14 and the outer circumferential surface of the cover member 15 matches the radial direction of the circumferential wall 14b of the rotor housing member 14.

In each of the above-described embodiments, the groove inner-side circumferential surface 61 and the groove outer-side circumferential surface 62 do not necessarily need to be parallel with the axial direction of the circumferential wall 14b of the rotor housing member 14, but may extend obliquely relative to the axial direction of the circumferential wall 14b of the rotor housing member 14 and be inclined relative to each other.

In the fourth embodiment, the groove inner-side circumferential surface 61 and the groove outer-side circumferential surface 62 of the seal accommodating groove 60 may include bent portions 66 and curved portions having a smaller curvature than the bent portions 66. Each curved portion connects an adjacent pair of the bent portions 66.

In each of the above-described embodiments, the material of the seal member 50 is not limited to rubber as long as it is an elastic body.

In each of the above-described embodiments, the drive rotor 20 and the driven rotor 21 may have a three-lobe shape or a four-lobe shape in a cross section perpendicular to the rotation axis direction of the drive shaft 16 and the driven shaft 17.

In each of the above-described embodiments, the drive rotor 20 and the driven rotor 21 may have helical shapes.

In each of the above-described embodiments, the fluid machine is not limited to the Roots pump 10, but may be a scroll compressor or a piston compressor. In short, the type of the fluid machine is not particularly limited as long as the fluid machine includes the housing 11, which has a first housing component and a second housing component that are coupled to each other.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fluid machine comprising:
    a housing that includes a first housing component and a second housing component, which are coupled to each other, wherein
    the first housing component and the second housing component respectively have a first forming surface and a second forming surface, which form mating surfaces of the first housing component and the second housing component, and
    an annular seal accommodating groove is provided in at least one of the first forming surface and the second forming surface; and a seal member made of an elastic body, the seal member being accommodated in the seal accommodating groove and sealing an inside of the housing from an outside, wherein
    the seal accommodating groove has a bottom surface and two side surfaces, which are connected to the bottom surface,
    the seal member includes
        a seal body that contacts the first housing component and the second housing component and is annular or ring-shaped, and
        a plurality of pushing projections that project from an inner circumferential surface of the seal body toward one of the side surfaces and are arranged at intervals in a circumferential direction of the inner circumferential surface of the seal body,
    the seal body is pushed against the side surfaces by the pushing projections between the side surfaces, and
    an outer circumferential surface of the seal body contacts an other one of the side surfaces in a circumferential direction of the outer circumferential surface,
    wherein an entire outer circumferential surface is parallel to the side surfaces.

2. The fluid machine according to claim 1, wherein
    the seal body includes
        a first seal portion that contacts the first housing component in a mating direction of the first forming surface and the second forming surface, and
        a second seal portion that contacts the second housing component in the mating direction,
    the first seal portion is constituted by a plurality of annular first lip portions, and
    the second seal portion is constituted by a plurality of annular second lip portions.

3. The fluid machine according to claim 2, wherein
    the seal body further includes
        an annular first recess provided between the adjacent first lip portions, and
        an annular second recess provided between the adjacent second lip portions, and
    the first recess and the second recess are deeper at positions corresponding to the pushing projections than other positions.

4. The fluid machine according to claim 2, wherein
    the seal accommodating groove is provided in the first forming surface,
    an opening of the seal accommodating groove is closed by the second forming surface, and
    a sum of lip widths of the second lip portions is greater than a sum of lip widths of the first lip portions.

5. The fluid machine according to claim 2, wherein
    the side surfaces each have a bent portion that is bent locally, and
    the pushing projections are arranged at positions that are spaced apart from the bent portion in a circumferential direction of the seal accommodating groove.

6. The fluid machine according to claim 2, wherein
    before the seal member is accommodated in the seal accommodating groove, the distance in the radial direction of the seal body between the outer circumferential surface of the seal body and a distal end of the pushing projection is smaller than the distance in the radial direction of the seal accommodating groove between the side surfaces.

7. The fluid machine according to claim 1, wherein
    the seal body further includes
        an annular first recess provided between the adjacent first lip portions, and
        an annular second recess provided between the adjacent second lip portions, and
    a depth of the seal accommodating groove is greater than a length of the straight line, which connects a deepest section of the first recess and a deepest section of the second recess.

* * * * *